United States Patent

Meiller

[11] Patent Number: 5,080,436
[45] Date of Patent: Jan. 14, 1992

[54] HEAD SUPPORT FOR A SEAT SUCH AS A VEHICLE SEAT

[75] Inventor: Hermann Meiller, Amberg, Fed. Rep. of Germany

[73] Assignee: Grammer AG, Amberg, Fed. Rep. of Germany

[21] Appl. No.: 651,939

[22] Filed: Feb. 7, 1991

[30] Foreign Application Priority Data

Apr. 6, 1990 [DE] Fed. Rep. of Germany ......... 4011109

[51] Int. Cl.$^5$ .............................................. A47C 1/10
[52] U.S. Cl. .................................... 297/391; 297/216
[58] Field of Search ............... 297/391, 400, 406, 407, 297/216, 409

[56] References Cited

U.S. PATENT DOCUMENTS 544,106  8/1895  Mann ................................. 297/407
3,337,268  8/1967  Belle ................................. 297/400

Primary Examiner—Peter R. Brown
Assistant Examiner—Milton Nelson, Jr.
Attorney, Agent, or Firm—Elliot M. Olstein; Raymond J. Lillie

[57] ABSTRACT

A head support for a seat comprises two head support carriers mounted in the backrest of the seat rotatably about their respective axes. The carriers are cranked at their upward ends which are towards the head support member. A respective bar in the form of a rack member is rotatably mounted to the cranked portion of each carrier, the bars being displaceable longitudinally relative to a line connecting the two carriers in respective guide which also entrain the head support member and the guide for the bars being rigidly coupled together. A pinion may mesh with the rack members between the bars for synchronized movement of the mechanism.

3 Claims, 1 Drawing Sheet

HEAD SUPPORT FOR A SEAT SUCH AS A VEHICLE SEAT

BACKGROUND OF THE INVENTION

A head support is commonly used on a seat such as a vehicle seat, to provide adequate support for the head of the person sitting in the seat, in particular to provide at least some safeguard for that person against the injury known as whiplash resulting for example from a rear-end impact against the vehicle. A typical form of head support comprises two head support carriers which are carried by the backrest portion of the seat. In another form of head support assembly, the head support member is arranged to be displaceable in a plane in parallel relationship with itself, generally along a centre line which is between the head support carriers and which extends normal to a notional line joining the head support carriers, transversely of the seat. Such an assembly is complicated in regard to handling however and the basic mechanism of the head support assembly is often not entirely satisfactory in terms of operation thereof.

SUMMARY OF THE INVENTION

An object of the present invention is to provide a head support for a seat such as a vehicle seat, which is readily adjustable in relation to the seat.

Another object of the present invention is to provide a head support assembly for a seat such as a motor vehicle seat, which is of a simple mechanical design configuration while providing satisfactory adjustment relative to the backrest portion of the seat in the fore-and-aft direction of the seat.

In accordance with the principles of the present invention, the foregoing and other objects are achieved by a head support for a seat which includes a backrest portion, the head support comprising a head support member supported by first and second head support carriers adapted to be mounted to the backrest portion of the seat rotatably about respective axes. Each head support carrier has an end portion projecting form the backrest portion of the seat, said end portion being of a cranked configuration and extending into the head support member. A respective bar portion is rotatably mounted to the cranked end portion of each of the head support carriers, and a respective guide means for each of the bar portions guides same slidably in the head support member. The guide means are fixed relative to the head support member and are rigidly coupled together, whereby the bar portions are displaceable longitudinally relative to a line connecting the first and second support carriers.

By virtue of that design configuration, as will become more readily apparent from the following description of a preferred embodiment of a head support according to the invention, synchronisation of the rotary movements of the cranked portions of the head support carriers is necessarily produced so that a rotary movement of the cranked portion of one head support carrier in the clockwise direction results in a corresponding rotary movement of the cranked portion of the other head support carrier in the anti-clockwise direction, with the head support member being displaced in parallel relationship with itself, by virtue of the bar portions being guided slidably in the guides of the head support member. The head support carriers can be mounted over a sufficiently long length thereof, in the backrest portion of the seat while adjustment in respect of inclination of the head support relative to the backrest portion of the seat may be effected by the head support carriers being mounted within the backrest portion of the seat pivotably about a common transversely extending axis. Adjustment in respect of height of the head support member can be achieved in the usual fashion by for example the head support carriers being supported in the backrest portion of the seat in such a way that they can be extended and retracted in a tube by a telescopic movement.

In accordance with a preferred feature of the invention the bar portions are in the form of toothed rack members while disposed therebetween is a pinion meshing therewith.

Further objects, features and advantages of the present invention will be apparent from the following description of a preferred embodiment thereof.

DESCRIPTION OF THE PREFERRED EMBODIMENT

Figure 1:
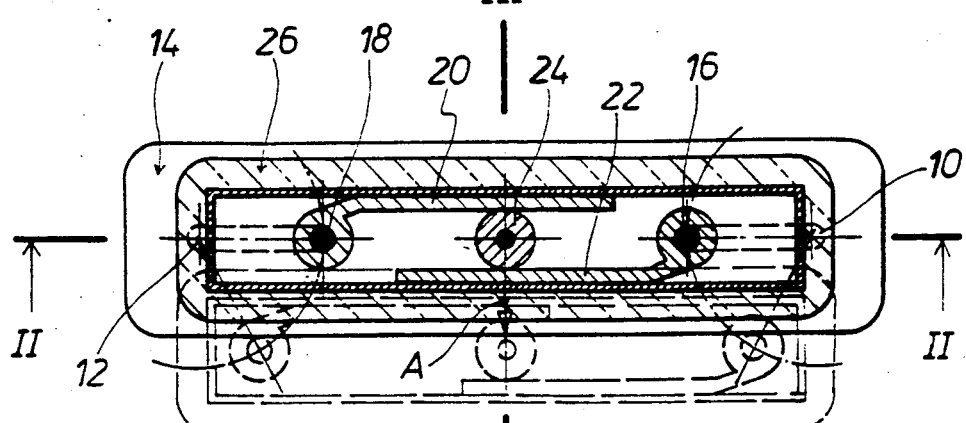
FIG. 1 is a plan view of an embodiment of a head support according to the invention, viewed in section, taken along line I—I in FIG. 2.

Looking at the drawing, reference numerals 10 and 12 denote first and second head support carriers which are carried by a backrest portion 14 of a seat such as a motor vehicle seat, in the upper part of the backrest portion. The head support carriers 10 and 12 are mounted in the backrest portion 14 rotatably about respective axes by any suitable form of rotational mounting. It will be noted at this point that the head support carriers may be adapted to provide for adjustment in respect of height, for example by means of a telescopic arrangement, and they may also be mounted pivotably about a transversely extending axis in the backrest portion 14, to provide for adjustment of the angle of inclination of the head support assembly.

Figure 2:
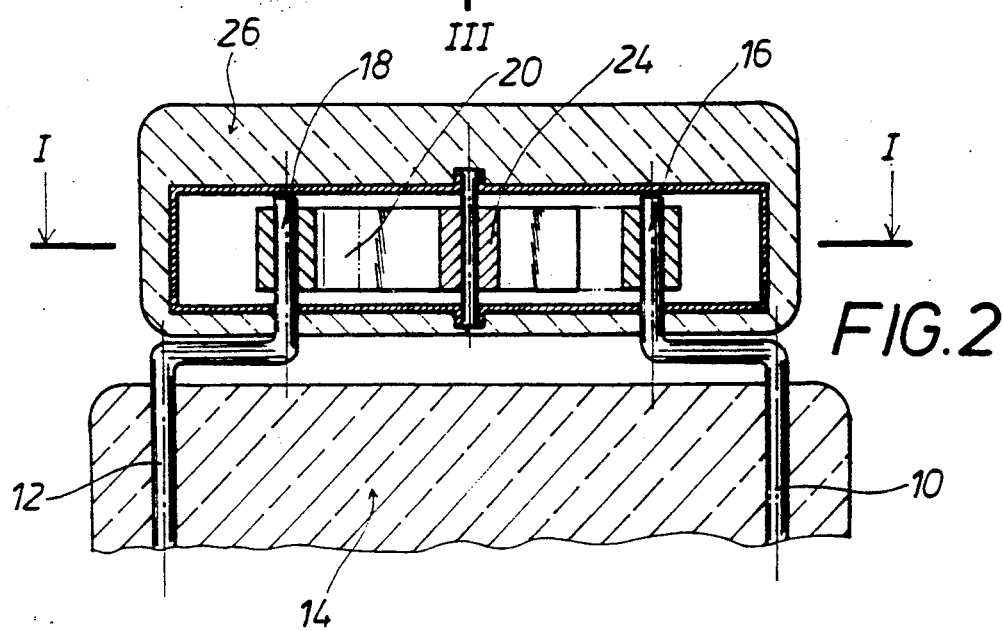
FIG. 2 is a front view of the head support shown in FIG. 1, in section taken along line II—II in FIG. 1.
Figure 3:
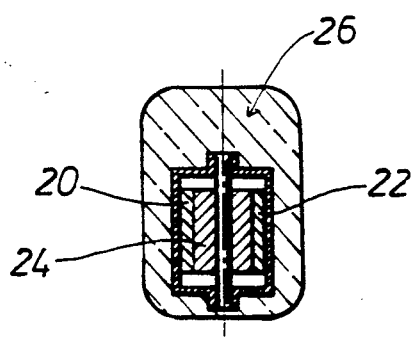
FIG. 3 is a view in section of the FIG. 1 head support, taken along line III—III therein.

Looking now more specifically at FIG. 2, each head support carrier 10 and 12 has at its upper end where it projects from the top edge of the backrest portion 14 a cranked configuration for supporting a head support member 26. More specifically, looking for example at the right-hand head support carrier 10, the cranked configuration at the upper end thereof comprises a portion extending substantially horizontally towards the left and then a further portion which extends at a right angle to the first-mentioned portion upwardly in FIG. 2, as identified as 16. A similar cranked portion is identified at 18 at the left-hand head support carrier 12.

Within the head support member 26, respective plate or bar portions 20 and 22 are mounted rotatably on respective ones of the cranked portions 16 and 18 of the head support carriers 10 and 12. It will be seen from FIG. 1 that the bar portions 20 and 22 each extend towards the respective other head support carrier, and also extend in mutually overlapping relationship over at least a portion of their length. The bar portions 20 and 22 are displaceable longitudinally relative to a notional line connecting the first and second head support carriers 10 and 12, being slidably guided in respective guide means within the head support member 26. The respective guide means are formed by a cage or box arrangement generally indicated at 28 so that the respective guide means for each of the bar portions 20 and 22 are rigidly coupled together as a result.

The cage 28 also carries a mounting pin (not referenced) on which a pinion 24 is rotatably carried. The teeth on the pinion 24 are in meshing engagement with respective tooth configurations provided on the adjoining surfaces of each of the bar portions 20 and 22 which are thus in the form of toothed rack members. The toothed rack members and the pinion 24 thus constitute a synchronising mechanism for synchronising movement of the cranked end portions 16 and 18 of the head support carriers 10 and 12. Such movement of the head support carriers 10 and 12 will also result in the head support member 26 being displaced in the fore-and-aft direction of the seat having the backrest portion 14, as will now be described in greater detail.

Thus, when the head support member 26 is moved for example in the direction indicated by the arrow A in FIG. 1, towards the position shown in broken lines therein, the cranked portion 18 of the head support carrier 12 rotates in the clockwise direction as viewing in FIG. 1 while, as a result of the synchronising mechanism referred to above, the cranked portion 16 of the other head support carrier 10 rotates in the anti-clockwise direction in a corresponding fashion. The toothed rack members formed by the bar portions 20 and 22 move in opposite directions, as can be clearly seen from a comparison between the solid-line position of the assembly shown in FIG. 1, and the broken-line position of the assembly also shown in FIG. 1. The synchronising mechanism therefore ensures that the head support member 26 is displaced in precisely parallel relationship to itself, in other words, when the head support member 26 is moved from the solid-line position to the broken-line position in FIG. 1, it is not twisted about a vertical axis for example but moves uniformly backwards or forwards in relation to the backrest portion 14. The plane of displacement which is generally horizontal is defined by the extent of the bending at the cranked configurations of the respective head support carriers.

It will be appreciated that the above-described construction has been set forth solely by way of example and illustration of the principles of the present invention and that various other modifications and alterations may be made therein without thereby departing from the spirit and scope of the invention.

What is claimed is:

1. A head support for a seat which includes a backrest portion, the head support comprising a head support member, first and second support carriers adapted to be supported by the backrest portion of the seat rotatably about respective axes, each head support carrier having an end portion of a cranked configuration towards the head support member, a respective bar portion mounted rotatably to the cranked end portion of each said head support carrier, and a respective guide means fixedly associated with the head support member and adapted to guide slidably the associated bar portions whereby the bar portions are displaceable longitudinally relative to a notional line connecting the first and second head support carriers, upon displacement of the head support member relative to the backrest portion of the seat, with movement of each of said end portions of a cranked configuration.

2. A head support as set forth in claim 1 wherein each bar portion comprises a rack member and further including a pinion disposed between and in meshing engagement with the rack members.

3. A vehicle seat including a backrest portion, a head support structure comprising first and second carriers having body portions extending into said backrest portion from an upper edge thereof and rotatably mounted to said backrest portion at a spacing from each other in a transverse direction of the backrest portion, the carriers further including an upper end portion projecting upwardly from the upper edge of the backrest portion and providing a cranked configuration, with the respective crankings being directed in opposite relationship to each other in the transverse direction of the backrest portion, first and second elongate rack members having first and second ends, each rack member having its first end mounted rotatably on the cranked configuration of a respective one of said carriers and the rack members extending towards each other in at least substantially parallel and mutually overlapping relationship, a head support member including first and second guide means slidably guiding respective ones of said rack members, thereby to support said head support member on said carriers, and a pinion disposed between said guide means and in meshing engagement with the respective rack members for synchronizing the rotary movement of said first and second carriers whereby said head support member is displaceable in a fore-and-aft direction of the seat in parallel relationship with itself in response to rotary movement of said carriers.

* * * * *